(12) United States Patent
Isowaki et al.

(10) Patent No.: US 8,551,348 B2
(45) Date of Patent: Oct. 8, 2013

(54) MAGNETIC RECORDING MEDIUM AND METHOD OF MANUFACTURING THE SAME

(75) Inventors: Yosuke Isowaki, Yokohama (JP); Satoshi Shirotori, Yokohama (JP); Yoshiyuki Kamata, Tokyo (JP); Kaori Kimura, Kawasaki (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 603 days.

(21) Appl. No.: 12/548,374

(22) Filed: Aug. 26, 2009

(65) Prior Publication Data

US 2009/0317662 A1 Dec. 24, 2009

Related U.S. Application Data

(63) Continuation of application No. PCT/JP2008/071917, filed on Nov. 26, 2008.

(30) Foreign Application Priority Data

Dec. 27, 2007 (JP) ................................. 2007-337810

(51) Int. Cl.
*B44C 1/22* (2006.01)
(52) U.S. Cl.
USPC .................... 216/22; 216/44; 216/66; 216/81
(58) Field of Classification Search
USPC ......................................... 216/22, 44, 66, 81
See application file for complete search history.

(56) References Cited

U.S. PATENT DOCUMENTS

| 5,168,845 | A | 12/1992 | Peaker |
| 5,766,718 | A | 6/1998 | Matsuda et al. |
| 6,168,845 | B1 * | 1/2001 | Fontana et al. ............... 428/836 |
| 6,841,224 | B2 | 1/2005 | Kamata et al. |
| 2007/0070547 | A1 * | 3/2007 | Kamata et al. ................ 360/135 |
| 2010/0232056 | A1 | 9/2010 | Fukushima et al. |
| 2010/0277829 | A1 | 11/2010 | Fukushima et al. |

FOREIGN PATENT DOCUMENTS

| JP | 05-205257 | 8/1993 |
| JP | 06-131658 | 5/1994 |
| JP | 2002-288813 | 10/2002 |
| JP | 2005-243131 | 9/2005 |
| JP | 2005-276275 | 10/2005 |
| JP | 2008-293573 | 12/2008 |
| JP | 2009-076146 | 4/2009 |
| JP | 2009-157983 | 7/2009 |
| WO | WO 03/019540 A1 | 3/2003 |

OTHER PUBLICATIONS

Japanese Office Action for Japanese Application No. 2007-337810, dated Jul. 29, 2009 and mailed Aug. 4, 2009, in 4 pages.
Explanation of Non-English Language References.

* cited by examiner

*Primary Examiner* — Shamim Ahmed
*Assistant Examiner* — Bradford Gates
(74) *Attorney, Agent, or Firm* — Knobbe, Martens, Olson & Bear LLP

(57) ABSTRACT

A magnetic recording medium has magnetic patterns formed of a patterned ferromagnetic layer, and a non-magnetic layer including a component of the ferromagnetic layer and separating the magnetic patterns, in which a thickness "a" of the non-magnetic layer and a thickness "b" of the magnetic patterns satisfy a relationship of: a<b.

2 Claims, 3 Drawing Sheets

US 8,551,348 B2

MAGNETIC RECORDING MEDIUM AND METHOD OF MANUFACTURING THE SAME

CROSS REFERENCE TO RELATED APPLICATIONS

This is a Continuation Application of PCT Application No. PCT/JP2008/071917, filed Nov. 26, 2008, which was published under PCT Article 21 (2) in English.

This application is based upon and claims the benefit of priority from Japanese Patent Application No. 2007-337810, filed Dec. 27, 2007, the entire contents of which are incorporated herein by reference.

BACKGROUND

1. Field

The present invention relates to a magnetic recording medium and a method of manufacturing the same.

2. Description of the Related Art

Recently, in magnetic recording media incorporated into hard disk drives (HDDs), there is an increasing problem of disturbance of enhancement of track density due to interference between adjacent tracks. In particular, a serious technical subject is reduction of a fringe effect of a field from a write head.

To solve such a problem, a discrete track recording-type patterned medium (DTR medium), for example, has been proposed in which recording tracks are physically separated by processing a ferromagnetic layer. The DTR medium can reduce a side erase phenomenon, i.e., erasing information of an adjacent track in writing, and a side read phenomenon, i.e., reading out information of an adjacent track in reading, making it possible to enhance the track density. Therefore, the DTR medium is expected as a magnetic recording medium capable of providing a high recording density.

In reading from and writing to a medium like a DTR medium with an irregular surface with a flying head, it is required to reduce surface irregularity of the DTR medium so as to bring about stable flying of the head. In an existing DTR medium, in order to form grooves separating adjacent tracks completely, for example, a protective film with a thickness of about 5 nm and a magnetic recording layer with a thickness of about 20 nm in total of about 25 nm are removed. On the other hand, the designed flying height of the flying head is about 10 nm. Accordingly, it has been carried out to fill the grooves with a nonmagnetic material so as to flatten the medium surface for ensuring flying stability of the head. However, filling the grooves with the non-magnetic layer to flatten the medium surface increases the number of manufacturing processes, which in turn increases the cost and also reduces the yield.

Under the circumstances, methods of modifying the ferromagnetic layer corresponding to non-recording regions between tracks into the non-magnetic layer have been used without introducing the irregular structure to the medium (see U.S. Pat. No. 6,841,224; Jpn. Pat. Appln. KOKAI Publication No. 5-205257; and U.S. Pat. No. 6,168,845). However, when the ferromagnetic layer in the non-recording regions are merely modified into the non-magnetic layer without introducing the irregular structure to the medium, boundaries between the magnetic patterns forming tracks and the non-magnetic layer are easily fluctuated, which may cause noise. Thus, how the magnetic properties of the non-recording regions can be modified while preventing the modification of the magnetic properties of the tracks becomes a problem.

BRIEF SUMMARY OF THE INVENTION

According to an aspect of the present invention, there is provided a magnetic recording medium comprising: magnetic patterns formed of a patterned ferromagnetic layer; and a non-magnetic layer comprising a component of the ferromagnetic layer and separating the magnetic patterns, wherein a thickness a of the non-magnetic layer and a thickness b of the magnetic patterns satisfy a relationship of: $a<b$.

According to another aspect of the present invention, there is provided a method of manufacturing a magnetic recording medium, comprising: forming a mask material on a ferromagnetic layer; imprinting a stamper on the mask material to transfer patterns of protrusions and recesses thereto; etching a part of the ferromagnetic layer positioned in the recesses of the patterns of protrusions and recesses; and modifying the ferromagnetic layer remaining in the recesses to form a non-magnetic layer including a component of the ferromagnetic layer together with magnetic patterns formed of the ferromagnetic layer separated by the non-magnetic layer.

DETAILED DESCRIPTION

Hereinafter, embodiments of the present invention will be described with reference to the drawings.

Figure 1:
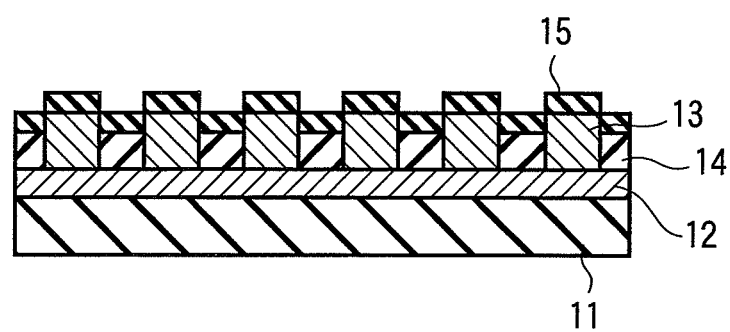
FIG. 1 is a cross-sectional view showing a magnetic recording medium according to an embodiment of the present invention.

FIG. 1 is a cross-sectional view showing a magnetic recording medium according to an embodiment of the present invention. The magnetic recording medium is a so-called patterned medium. The patterned medium herein includes a discrete track recording (DTR) medium and a bit patterned media (BPM). Such a magnetic recording medium is mounted on a hard disk drive. The magnetic recording medium in FIG. 1 comprises an underlayer 12 formed on a nonmagnetic substrate 11, a magnetic recording layer formed on the underlayer 12 and comprising magnetic patterns 13 formed of a patterned ferromagnetic layer and a non-magnetic layer 14 separating the magnetic patterns 13, and a protective film 15 formed on the magnetic recording layer. The underlayer 12 includes a soft magnetic underlayer, a non-magnetic intermediate layer, and a domain control layer. The magnetic patterns 13 are patterned into, for example, the morphology of tracks to which recording is performed. The non-magnetic layer 14 cannot be recorded. The non-magnetic layer 14 is made of an oxide produced by a reaction of the ferromagnetic layer with oxygen, where the ferromagnetic properties are degraded or disappears. In the present invention, the thickness "a" of the non-magnetic layer 14 and the thickness "b" of the magnetic pattern 13 satisfy the relationship of: $a<b$.

In the conventional patterned media (DTR media and bit patterned media), the ferromagnetic layer is processed in entire thickness thereof. Meanwhile, in the present invention, the magnetic interference between the magnetic patterns and the non-magnetic layer can be suppressed without processing the ferromagnetic layer in entire thickness thereof. In addition, since the depth of the recesses on the surface thereof is small, a process of filling the recesses with a nonmagnetic material for the purpose of ensuring the head flying property can be omitted or can be easily carried out.

In formation of the non-magnetic layer 14, it is not necessary to oxidize the entire thickness of the ferromagnetic layer present in the non-recording regions. The lower limit of the thickness of the non-magnetic layer (oxide layer) 14 is not particularly limited because it is appropriately adjusted depending on BER (bit error rate) of the manufactured medium attained when it is mounted on a drive. The thickness of the non-magnetic layer (oxide layer) 14 is preferably equal to or less than the thickness of the ferromagnetic layer present in the non-recording regions. When the thickness of the non-magnetic layer (oxide layer) 14 is larger than the thickness of the ferromagnetic layer present in the non-recording regions, that is, when oxygen enters the underlayer, corrosion occurs from the underlayer, leading to degraded head flying properties.

A part of a ferromagnetic layer constituting magnetic patterns in a perpendicular magnetic recording medium has a granular structure, in which an oxide is included. In this case, the oxygen concentration of the non-magnetic layer 14 is preferably higher than that of the ferromagnetic layer constituting the magnetic pattern. In order to improve SNR, it is preferable that the oxygen concentration of the non-magnetic layer 14 should be three times or more the oxygen concentration of the ferromagnetic layer.

When the transition region of the oxygen concentration in the boundary between the magnetic pattern 13 and the non-magnetic layer 14 is broadened, the fringe properties are degraded to lower BER. Therefore, it is preferable that the transition region be made narrow. The transition region width, however, is not particularly limited.

In the present invention, the height difference between the magnetic pattern 13 and the non-magnetic layer 14 is preferably 10 nm or less in view of the head flying stability, but it is not particularly limited.

FIGS. 2A to 2J are cross-sectional views showing an example of a method of manufacturing the magnetic recording medium according to the present invention.

Figure 2A:
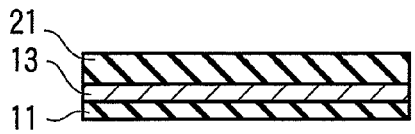
FIGS. 2A to 2J are cross-sectional views showing an example of a method of manufacturing the magnetic recording medium according to the present invention.

As shown in FIG. 2A, a soft magnetic underlayer made of CoZrNb having a thickness of 100 nm and a non-magnetic intermediate layer made of Ru having a thickness of 20 nm are deposited on the glass substrate 11. For ease of drawing, the soft magnetic underlayer and the non-magnetic intermediate layer are not illustrated in FIGS. 2A to 2J. A ferromagnetic layer 13 made of CoCrPt—$SiO_2$ (15 nm)/CoCrPt (5 nm) having a thickness of 20 nm is deposited on the non-magnetic intermediate layer. A carbon film (diamond-like carbon: DLC) as a first mask material 21 having a thickness of 20 nm is deposited on the ferromagnetic layer 13.

Figure 2B:
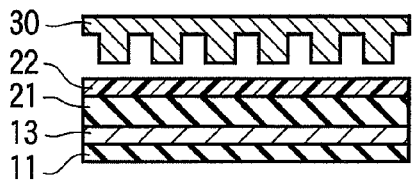

As shown in FIG. 2B, a resist of spin-on-glass (SOG) as a second mask material 22 is applied to the first mask material 21 by spin-coating. Meanwhile, a mold such as a Ni stamper on which predetermined patterns of protrusions and recesses are formed with electron-beam (EB) lithography equipment is provided. The irregular surface of the mold 30 is made to face the second mask material 22.

Figure 2C:
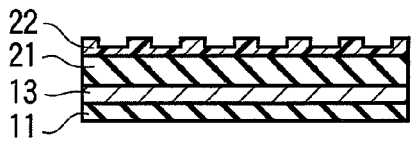

As shown in FIG. 2C, the second mask material (SOG) 22 is pressed with the mold 30 to transfer the patterns of protrusions and recesses to the second mask material 22 by imprinting, and then the mold 30 is removed. Resist residues are present in the recesses of patterns transferred to the second mask material 22.

Figure 2D:
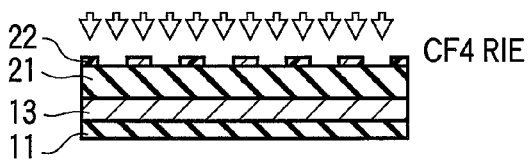

As shown in FIG. 2D, the resist residues in the recesses of the second mask material 22 is removed by dry etching to expose the surface of the first mask material (DLC) 21. At this time, the resist residues are removed with $CF_4$ as an etching gas with an inductively coupled plasma (ICP) RIE apparatus, for example.

Figure 2E:
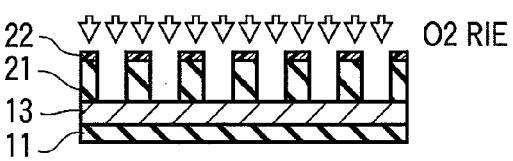

As shown in FIG. 2E, the first mask material (DLC) 21 is etched with oxygen as an etching gas to expose the ferromagnetic layer 13, using the patterns of the remaining second mask material (SOG) 22 as masks.

Figure 2F:
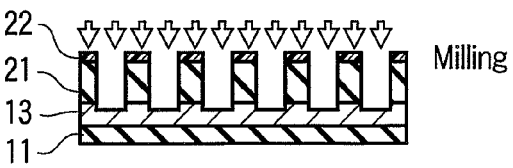

As shown in FIG. 2F, Ar ion milling is performed with, for example, an electron cyclotron resonance (ECR) ion gun apparatus as a milling apparatus, and the exposed ferromagnetic layer is partly etched by using the patterns of the second mask material (SOG) 22 and the first mask material (DLC) 21 as masks to form patterns of protrusions and recesses with a depth of about 5 nm on the surface of the ferromagnetic layer.

Figure 2G:
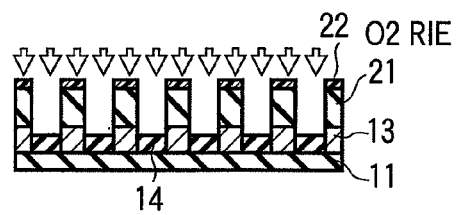

As shown in FIG. 2G, the exposed ferromagnetic layer is modified by, for example, ICP-RIE dry etching with oxygen as an etching gas using the patterns of the second mask material (SOG) 22 and the first mask material (DLC) 21 as masks to form the non-magnetic layer 14 made of an oxide of the ferromagnetic layer and to form the magnetic patterns 13 separated by the non-magnetic layer 14.

Figure 2H:
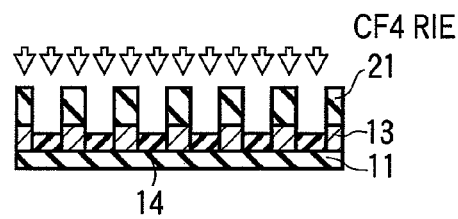

As shown in FIG. 2H, the second mask material (SOG) 22 is peeled off with $CF_4$ as an etching gas with an ICP-RIE apparatus, for example.

Figure 2I:
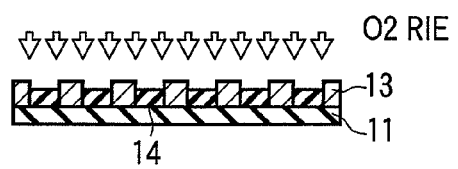

As shown in FIG. 2I, the first mask material (DLC) 21 is peeled off with oxygen as an etching gas with an ICP-RIE apparatus, for example.

Figure 2J:
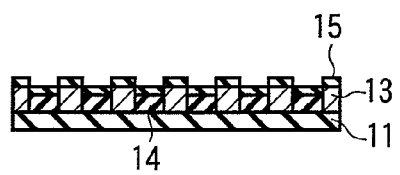

As shown in FIG. 2J, the protective film 15 made of DLC with a thickness of 3 nm is deposited by chemical vapor deposition (CVD). Thus, the magnetic recording medium of the present invention shown in FIG. 1 can be provided.

Here, the etching process of the ferromagnetic layer in FIG. 2F and the modifying process in FIG. 2G will be described in more detail.

In the etching process of the ferromagnetic layer in FIG. 2F, the exposed ferromagnetic layer is partly etched by using the patterns of the second mask material (SOG) 22 and the first mask material (DLC) 21 as masks. It is preferable that Ar ion milling is used for etching the ferromagnetic layer. When the ferromagnetic layer is processed by Ar ion milling, the etching is performed at an accelerating voltage of, for example, 400 V, while an ion incident angle is changed from 30° to 70°. In the milling with an ECR ion gun, stationary counter arrangement, in which an ion incident angle is 90°, makes it possible to process the ferromagnetic layer so that there is little taper on the sidewall of protruded magnetic patterns.

The milling depth is preferably 1 nm or more. When the milling depth is 1 nm or more, a micro-loading phenomenon occurs in oxygen RIE performed for modifying the ferromagnetic layer and the amount of oxygen radicals entering the non-recording regions are increased, and therefore, the modifying efficiency for the ferromagnetic layer is improved. In addition, the transition of oxygen distribution in the boundaries between the magnetic patterns and the non-magnetic layer is made steep, whereby fringe properties are improved to provide a high SNR. Although the upper limit of the milling depth is appropriately adjusted in accordance with head flying properties, the milling depth is preferably as small as possible as long as it is 1 nm or more.

In the modifying process of the ferromagnetic layer in FIG. 2G, the non-recording regions of the ferromagnetic layer exposed after the surface etching is oxidized in the depth direction, by which the ferromagnetic properties of the oxidized ferromagnetic layer are degraded or lost. This process may be carried out after the ferromagnetic layer is etched and under the state that the second mask material (SOG) 22 as a resist has remained on the carbon-based first mask material (DLC) 21 (method A), or may be carried out after the ferromagnetic layer is etched and then the second mask material (SOG) 22 is stripped off (method B). Further, the second mask material (SOG) 22 may be stripped off prior to the etching of the ferromagnetic layer (method C). These methods are not particularly limited. When the methods B and C are used, the modifying process and the stripping-off process of the carbon-based first mask material can be simultaneously carried out.

The thickness of the carbon-based first mask material 21 is preferably 5 nm or more and 40 nm or less. If the thickness is less than 5 nm, in the etching of the ferromagnetic layer by Ar ion milling, taper occurs on the sidewall of the magnetic patterns. Consequently, the tapered shape is reflected in the modifying process of the ferromagnetic layer so as to degrade the fringe properties, leading to poor BER. Therefore, in the present invention, the thickness of the carbon-based first mask material 21 is preferably 5 nm or more.

On the other hand, as the thickness of the carbon-based first mask material 21 is larger, the taper on the sidewall of the magnetic patterns is made smaller in etching of the ferromagnetic layer by Ar ion milling. In addition, in the modifying process, only oxygen radicals higher in anisotropy reach the ferromagnetic layer in the non-recording regions, which makes it possible to prevent degradation of the magnetic properties of the magnetic patterns due to the phenomenon that oxygen introduced into the ferromagnetic layer diffuse toward the magnetic patterns. If the thickness of the carbon-based first mask material 21 exceeds 40 nm, however, burrs made of re-deposited product are formed in Ar ion milling which degrade the head flying properties. Therefore, the thickness of the carbon-based first mask material 21 is preferably 40 nm or less.

It is not necessary to strip off the carbon-based first mask material 21 completely, and a part of the first mask material 21 may be remained, which is used as a protective film for the magnetic patterns. The thickness of the first mask material 21 to be remained is set appropriately depending on the head flying properties, however, if the thickness is about 5 nm, the stripping process may be omitted.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are deteriorated, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be deteriorated. The perpendicular squareness of the perpendicular magnetic recording layer is preferably 0.8 or more. If the perpendicular squareness is less than 0.8, the thermal fluctuation resistance tends to be deteriorated.

<Protective Layer>

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, $SiO_2$ or $ZrO_2$. The thickness of the protective layer is preferably 1 to 10 nm. This is preferable for high-density recording because the distance between the head and the medium can be reduced. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

<Imprinting>

A resist is applied to the surface of a substrate by spin-coating and then, a stamper is pressed against the resist to thereby transfer the patterns of the stamper to the resist. As the resist, for example, spin-on-glass (SOG) may be used. The surface of the stamper on which patterns of protrusions and recesses corresponding to servo information and recording tracks are formed is made to face the resist on the substrate. In this process, the stamper, the substrate and a buffer layer are placed on the lower plate of a die set and are sandwiched between the lower plate and the upper plate of the die set to be pressed under a pressure of 2000 bar for 60 seconds, for example. The height of the protrusions of the patterns formed on the resist by imprinting is, for instance, 60 to 70 nm. The above conditions are kept for about 60 seconds for transporting the resist to be excluded. In this case, if a fluorine-containing peeling agent is applied to the stamper, the stamper can be peeled from the resist satisfactorily.

<Removal of Resist Residues>

Resist residues left unremoved on the bottoms of the recesses of the resist are removed by RIE (reactive ion etching). In this process, an appropriate process gas corresponding to the material of the resist is used. As the plasma source, ICP (inductively coupled plasma) apparatus capable of producing high-density plasma under a low pressure is preferable, but an ECR (electron cyclotron resonance) plasma or general parallel-plate RIE apparatus may be used.

<Stripping of Resist>

After the magnetic recording layer is etched, the resist is stripped off. When SOG is used as the resist, SOG is stripped off by RIE using fluorine-containing gas. As the fluorine-containing gas, $CF_4$ or $SF_6$ is suitable. Note that, it is preferable to carry out rinsing with water because the fluorine-containing gas reacts with moisture in the atmosphere to produce an acid such as HF and $H_2SO_4$.

<Deposition of Protective Layer and Aftertreatment>

A carbon protective layer is deposited. The carbon protective layer may be deposited by CVD, sputtering or vacuum evaporation. CVD produces a DLC film containing a large amount of $sp^3$-bonded carbon. The carbon protective layer with a thickness less than 1 nm is not preferable because it results in unsatisfactory coverage. Whereas, a carbon protective layer with a thickness exceeding 10 nm is not preferable because it increases magnetic spacing between a read/write head and a medium, leading to a reduction in SNR. A lubricant is applied to the surface of the protective layer. As the lubricant, for example, perfluoropolyether, fluorinated alcohol, fluorinated carboxylic acid or the like is used.

Figure 3:
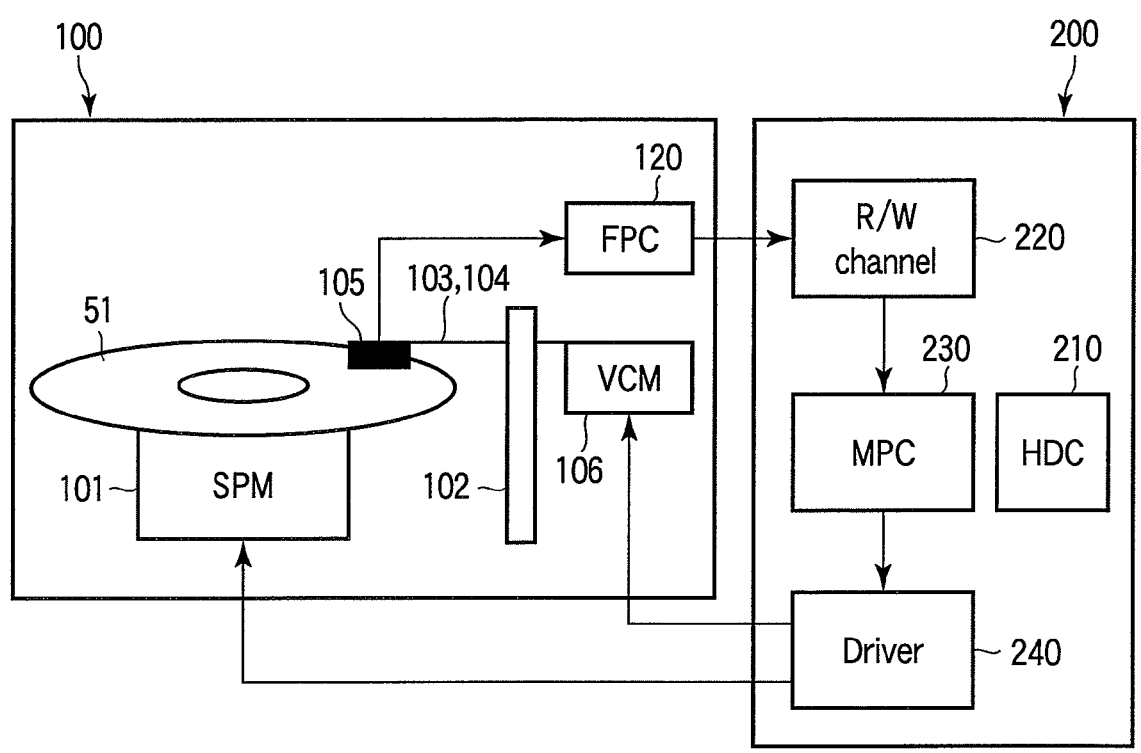
FIG. 3 is a block diagram of a magnetic recording apparatus according to the embodiment of the present invention.

Now, a magnetic recording apparatus having the magnetic recording medium according to the present invention will be described. FIG. 3 shows a block diagram of the magnetic recording apparatus according to an embodiment of the present invention. The figure shows a head slider only over a top side of the magnetic recording medium. However, a perpendicular magnetic recording layer having discrete tracks is formed on both sides of the magnetic recording medium. A down head and an up head are provided over the top side and under the bottom side of the magnetic recording medium, respectively. The configuration of the magnetic recording apparatus according to the present invention is basically similar to that of the conventional magnetic recording apparatus except that the former uses the magnetic recording medium according to the present invention.

A disk drive includes a main body portion called a head disk assembly (HDA) 100 and a printed circuit board (PCB) 200.

The head disk assembly (HDA) 100 has a magnetic recording medium (DTR medium) 51, a spindle motor 101 that rotates the magnetic recording medium 51, an actuator arm 103 that moves around a pivot 102, a suspension 104 attached to a tip of the actuator arm 103, a head slider 105 supported by the suspension 104 and including a read head and a write head, a voice coil motor (VCM) 106 that drives the actuator arm 103, and a head amplifier (not shown) that amplifies input signals to and output signals from the head. The head amplifier (HIC) is provided on the actuator arm 103 and connected to the printed circuit board (PCB) 200 via a flexible cable (FPC) 120. Providing the head amplifier (HIC) on the actuator arm 103 as described above enables an effective reduction in noise in head signals. However, the head amplifier (HIC) may be fixed to the HDA main body.

The perpendicular magnetic recording layer is formed on both sides of the magnetic recording medium 51 as described above. On each of the opposite perpendicular magnetic recording layers, the servo zones are formed like circular arcs so as to coincide with the locus along which the head moves. Specifications for the magnetic recording medium satisfy an outer diameter, an inner diameter, and read/write properties which are adapted for the drive. The radius of the circular arc formed by the servo zone is given as the distance from the pivot to the magnetic head element.

Four main system LSIs are mounted on the printed circuit board (PCB) 200. The four main system LSIs include a disk controller (HDC) 210, a read/write channel IC 220, a MPU 230, and a motor driver IC 240.

The MPU 230 is a control section for a driving system and includes ROM, RAM, CPU, and a logic processing section which are required to implement a head positioning control system according to the present embodiment. The logic processing section is an arithmetic processing section composed of a hardware circuit to execute high-speed arithmetic processes. The firmware (FW) for the logic processing section is stored in ROM. MPU controls the drive in accordance with FW.

The disk controller (HDC) 210 is an interface section in the hard disk and exchanges information with an interface between the disk drive and a host system (for example, a personal computer), MPU, the read/write channel IC, and the motor driver IC to control the entire drive.

The read/write channel IC 220 is a head signal processing section composed of a circuit which switches a channel to the head amplifier (HIC) and which processes read/write signals.

The motor driver IC 240 is a driver section for the voice coil motor (VCM) 77 and the spindle motor 72. The motor driver IC 240 controls the spindle motor 72 to a given rotation speed and provides a VCM manipulation variable from MPU 230 to VCM 77 as a current value to drive a head moving mechanism.

Embodiments of the present invention will be described below.

First, as a preliminary experiment, a magnetic recording medium was manufactured by a method similar to that described in FIGS. 2A to 2I, with the exception of applying the second mask material (SOG) 22 so that the thickness thereof was made to be the same as the thickness of the residues after imprinting and omitting the imprinting process. Namely, the magnetic recording medium (hereinafter referred to as a medium A) having the non-magnetic layer 14 made of an oxide of the ferromagnetic layer on its entire surface was manufactured. The oxygen profile of the medium A in the depth direction was measured with AES (scanning Auger electron spectrometer), whereby the thickness of the oxide forming the non-magnetic layer 14 was determined. As a result of the measurement, it was found that the thickness of the oxide was 10 nm on the basis of the change of spectrum intensity different from the change due to the granular structure. When the composition on the surface of the medium A was analyzed by XPS (X-ray photoelectron spectroscopy), the peak for CoO (781 eV) was identified. When the magnetization curve was measured based on a magnetooptic Kerr effect, a clear hysteresis curve could not be obtained, which showed that the ferromagnetic properties were lost.

For comparison, a magnetic recording medium (hereinafter referred to as a medium B) was manufactured by a method similar to that applied to the medium A with the exception that the ferromagnetic layer was exposed to the air for day and night instead of performing the modifying process of the ferromagnetic layer. When the oxygen profile of the medium B in the depth direction was measured with AES to obtain the thickness of the oxide, it was found that the thickness of the oxide was 2 nm. When the composition on the surface of the medium B was analyzed by XPS (X-ray photoelectron spectroscopy), the peak for CoO (781 eV) was identified. When the magnetization curve was measured based on the magnetooptic Kerr effect, it was found that a magnetization reversal nucleation field Hn was 1.0 kOe, the coercivity Hc was 3.5 kOe, and the saturation field Hs was 6.5 kOe. It was found that the ferromagnetic properties were not lost completely though degradation of the ferromagnetic propertied was observed.

On the basis of the above results, it was found that in the magnetic recording medium by the method including the modifying process according to the present invention, not by natural oxidation, degradation or loss of ferromagnetic properties enough to obtain a good BER occurs due to the presence of the oxide layer in the non-recording regions.

EXAMPLE 1

A magnetic recording medium according to the present invention, shown in FIG. 1, was manufactured by using the method shown in FIGS. 2A to 2J. The height difference (b–a) between the thickness "a" of the non-magnetic layer and the thickness "b" of the magnetic patterns was adjusted by setting the milling time. It was confirmed that the height difference was 5 nm by AFM measurement.

The Ni stamper used in the production of the magnetic recording medium was produced by forming the patterns of protrusions and recesses together with patterns used as control data for head positioning in EB lithography. Therefore, the magnetic recording medium coated with a lubricant can be mounted on a hard disk drive.

When the resultant magnetic recording medium was measured for the thickness of the oxide of the ferromagnetic layer constituting the non-magnetic layer with AES, the medium showed oxygen distribution similar to that of the medium A, and it was found that the thickness of the oxide was 10 nm. When the oxygen concentration of the magnetic patterns was compared with that of the non-magnetic layer by TEM-EDX, it was found that 12 atomic percent and 34 atomic percent, respectively, which showed that the oxygen concentration was higher in the non-magnetic layer than in the magnetic patterns.

When MFM measurement was performed after DC demagnetization, a magnetic contrast corresponding to the patterns of protrusions and recesses was obtained, which showed that the magnetic properties were lost in non-recording regions into nonmagnetic properties.

When the manufactured magnetic recording medium was coated with a lubricant and was estimated in a drive, it exhibited good head flying properties. In addition, when recording was repeated 100000 times to the adjacent track and then the on-track BER was measured, the BER was the power of –6.2.

COMPARATIVE EXAMPLE 1

A magnetic recording medium was manufactured by a method similar that used in Example 1 with the exception of omitting the modifying process for the ferromagnetic layer. The manufactured magnetic recording medium was coated with a lubricant and was estimated in a drive. When recording was repeated 100000 times to the adjacent track and then the on-track BER was measured, it was degraded to the power of –3.6. From the result, it was found that the medium was significantly degraded in fringe resistance compared with the medium manufactured in Example 1.

When the medium was examined by MFM measurement, magnetic contrast was observed also in the non-recording regions. Thus, it was found that the ferromagnetic properties in the non-recording regions were not degraded enough, showing that magnetic interference between the magnetic patterns and the non-magnetic layer could not be suppressed.

From the results of Example 1 and Comparative Example 1, it was found that the modifying process for the ferromagnetic layer in the present invention was effective for degradation or loss of the ferromagnetic properties in the non-recording regions in the magnetic recording layer.

EXAMPLE 2

In the method shown in FIGS. 2A to 2J, the time required for etching the ferromagnetic layer by Ar ion milling was adjusted to set the height difference on the surface to 1 nm, 5 nm, or 10 nm. In addition, the oxygen gas etching time in the modifying process for the ferromagnetic layer was adjusted depending on the height difference in the magnetic recording layer so that the depth of the oxide in the non-recording regions reached the bottom of the magnetic recording layer without reaching Ru, the non-magnetic intermediate layer. The other processes are similar to those shown in FIGS. 2A to 2J.

By the method described above, magnetic recording medium of the present invention shown in FIG. 1, in which the difference (b–a) between the thickness "b" of the magnetic patterns and the thickness "a" of the non-magnetic layer was 1 nm, 5 nm, or 10 nm, was manufactured.

When the manufactured magnetic recording medium was coated with a lubricant and was estimated in a drive, every medium exhibited stable head flying properties. When the on-track BER was measured in the same manner as in Example 1, a good BER was provided.

COMPARATIVE EXAMPLE 2

A magnetic recording medium in which there was no difference between the thickness "b" of the magnetic patterns and the thickness "a" of the non-magnetic layer was manufactured by a method similar to that applied to Example 2 with the exception of omitting the etching process of the ferromagnetic layer by Ar ion milling.

When the manufactured magnetic recording medium was coated with a lubricant and was estimated in a drive, it exhibited poor fringe properties, where favorable on-track BER could not be obtained.

The results of Comparative Example 2 and Example 2 are summarized in Table 1. Table 1 shows that, in order to provide the stable head flying properties and a favorable on-track BER, the height difference between the thickness "b" of the magnetic pattern and the thickness "a" of the non-magnetic layer should be 1 nm or more.

TABLE 1

Height difference (b – a) on the surface of the magnetic recording layer and BER

| | Height difference (b – a) [nm] | | | |
|---|---|---|---|---|
| | 0 | 1 | 5 | 10 |
| BER [10⁻ˣ] | 3.9 | 6.1 | 6.2 | 6.5 |

EXAMPLE 3

In the method shown in FIGS. 2A to 2J, a magnetic recording medium was manufactured under the condition that the thickness of the first mask material (DLC) 21 was set to 5 nm, 20 nm, or 40 nm. In the etching process with oxygen applied to the DLC for exposing the surface of the ferromagnetic layer and the stripping process of the DLC, the etching time was adjusted depending on the thickness of the DLC. The other processes are similar to those shown in FIGS. 2A to 2J. As described above, the thickness of the first mask material (DLC) deposited before processing was varied, whereby a magnetic recording medium of the present invention shown in FIG. 1 was manufactured.

When the manufactured magnetic recording medium was coated with a lubricant and was estimated in a drive, every medium exhibited stable head flying properties. When recording was repeated 100000 times to the adjacent track and then the on-track BER was measured, a good BER was provided.

COMPARATIVE EXAMPLE 3

A magnetic recording medium was manufactured under the condition that the thickness of the first mask material (DLC) 21 was set to 2 nm or 50 nm.

The manufactured magnetic recording medium was coated with a lubricant and was estimated in a drive. The medium with the DLC having a thickness of 2 nm showed degraded fringe properties, where high on-track BER could not be obtained. The medium with the DLC having a thickness of 50 nm showed unstable flying properties, leading to drive crash.

The result of the AFM measurement for the above media is as follows. It is found that in the medium with the DLC having a thickness of 50 nm, horn-like burrs occurred on the sidewall of the protruded magnetic patterns. It is found that the burrs were made of the re-deposited product in Ar ion milling. In the medium with the DLC having a thickness of 2 nm, there was no particular defect in the AFM measurement. From cross-sectional TEM observation, however, the medium with the DLC having a thickness of 2 nm had a more significant tapered shape in the sidewall of the magnetic patterns compared with the medium with the DLC having a thickness of 5 nm showing favorable drive properties. It is considered that this is because the small thickness of the DLC caused the tapered shape of the magnetic patterns in etching of the ferromagnetic layer and the tapered shape in turn brought about degradation of the magnetic properties in the modifying process, leading to degraded fringe properties.

The results of Comparative Example 3 and Example 3 are summarized in Table 2. Table 2 shows that, if the thickness of the carbon-based first mask material is 5 nm or more and 40 nm or less, it is possible to provide a magnetic recording medium having stable head flying properties and a favorable on-track BER.

TABLE 2

DLC thickness and BER

| | DLC thickness [nm] | | | | |
|---|---|---|---|---|---|
| | 2 | 5 | 20 | 40 | 50 |
| BER [$10^{-x}$] | 4.7 | 6.0 | 6.2 | 6.6 | — |

As described above, according to the magnetic recording medium of the present invention, the following effects can be provided:

(1) The medium of the present invention shows better head flying properties, compared with a conventional medium in which the ferromagnetic layer is completely separated, because the magnetic interference between the magnetic patterns and the non-magnetic layer can be suppressed through a smaller surface irregularity;

(2) The medium of the present invention has good adhesion between the ferromagnetic layer and the DLC and high impact resistant, because the non-magnetic layer is made of an oxide of the ferromagnetic layer; and (3) In the medium of the present invention, the magnetic properties in the non-recording regions can be effectively degraded or lost while preventing the degradation of the magnetic properties of the magnetic patterns.

What is claimed is:

1. A method of manufacturing a magnetic recording medium, comprising:

forming a first mask material made of a carbon film and a second mask material made of a resist film on a ferromagnetic layer;

printing a stamper on the second mask material made of the resist film in order to transfer patterns of protrusions and recesses from the stamper;

etching the first mask material made of the carbon film using the second mask material made of the resist film as a mask to which the patterns of protrusions and recesses are transferred in order to transfer patterns of protrusions and recesses;

stripping the second mask material made of the resist film followed by etching a portion of the ferromagnetic layer in the recesses of the patterns of protrusions and recesses, or etching a portion of the ferromagnetic layer in the recesses of the patterns of protrusions and recesses followed by stripping the second mask material made of the resist film; and modifying the ferromagnetic layer in the recesses by reacting with either oxygen or oxygen mixed gas in order to form a non-magnetic layer comprising a component of the ferromagnetic layer together with magnetic patterns comprising the ferromagnetic layer separated by the non-magnetic layer and simultaneously stripping the first mask material made of the carbon film.

2. The method of claim 1, wherein the thickness of the first mask material made of the carbon film is 5 nm or more and 40 nm or less.

\* \* \* \* \*